No. 861,296. PATENTED JULY 30, 1907.
P. M. LEFTRIDGE.
ANIMAL LIFTER.
APPLICATION FILED JUNE 15, 1906.

2 SHEETS—SHEET 2.

Witnesses
T. P. Britt
K. H. Whitcomb

Inventor
P. M. Leftridge

By
Swift &c.
Attorneys

THE NORRIS PETERS CO., WASHINGTON, D. C.

UNITED STATES PATENT OFFICE.

PHILIP M. LEFTRIDGE, OF INDUSTRY, ILLINOIS.

ANIMAL-LIFTER.

No. 861,296.      Specification of Letters Patent.      Patented July 30, 1907.

Application filed June 15, 1906. Serial No. 321,854.

To all whom it may concern:

Be it known that I, PHILIP M. LEFTRIDGE, a citizen of the United States, residing at Industry, in the county of McDonough and State of Illinois, have invented a new and useful Animal-Lifter; and I do hereby declare the following to be a full, clear, and exact description of the invention, such as will enable others skilled in the art to which it appertains to make and use the same.

The invention relates to derricks or animal lifters, and is more especially adapted for handling butchered hogs, but it will be seen that the invention is adapted to be used in various kinds of slaughter houses, and the like.

Figure 1:
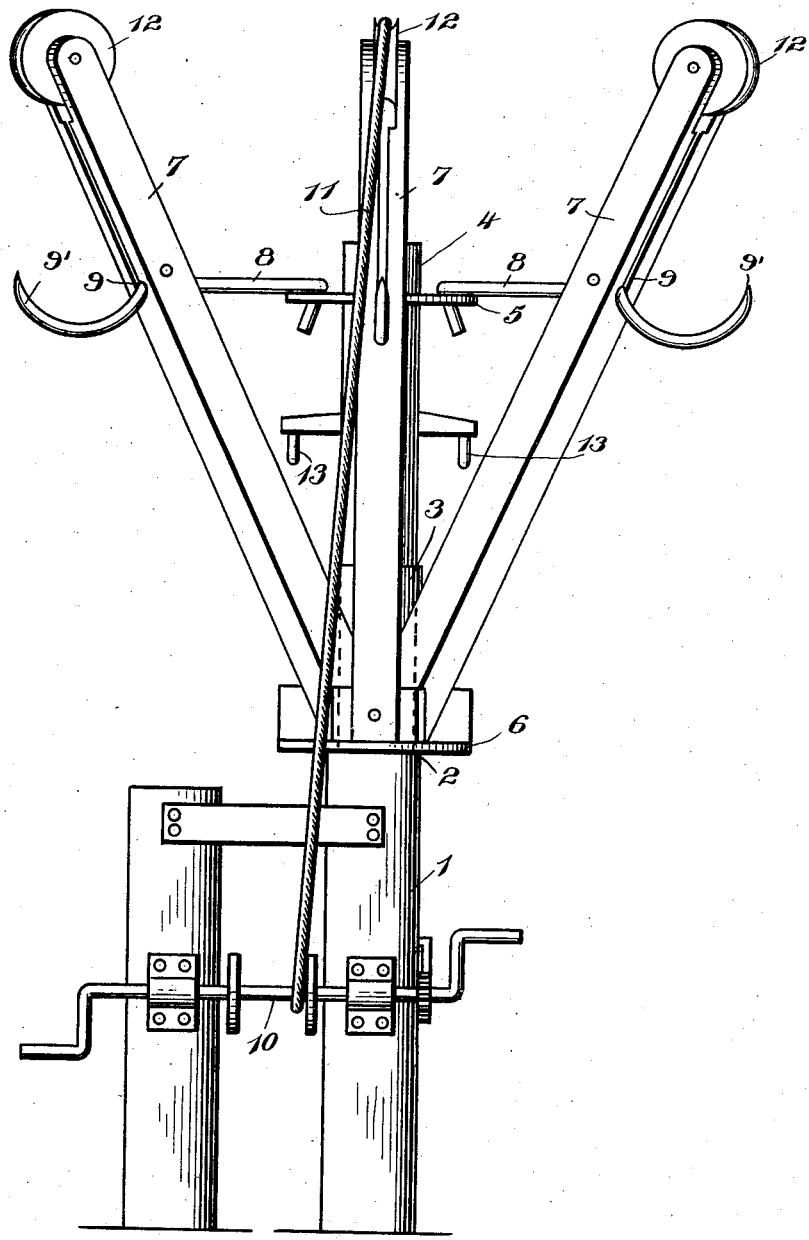
Figure 2:
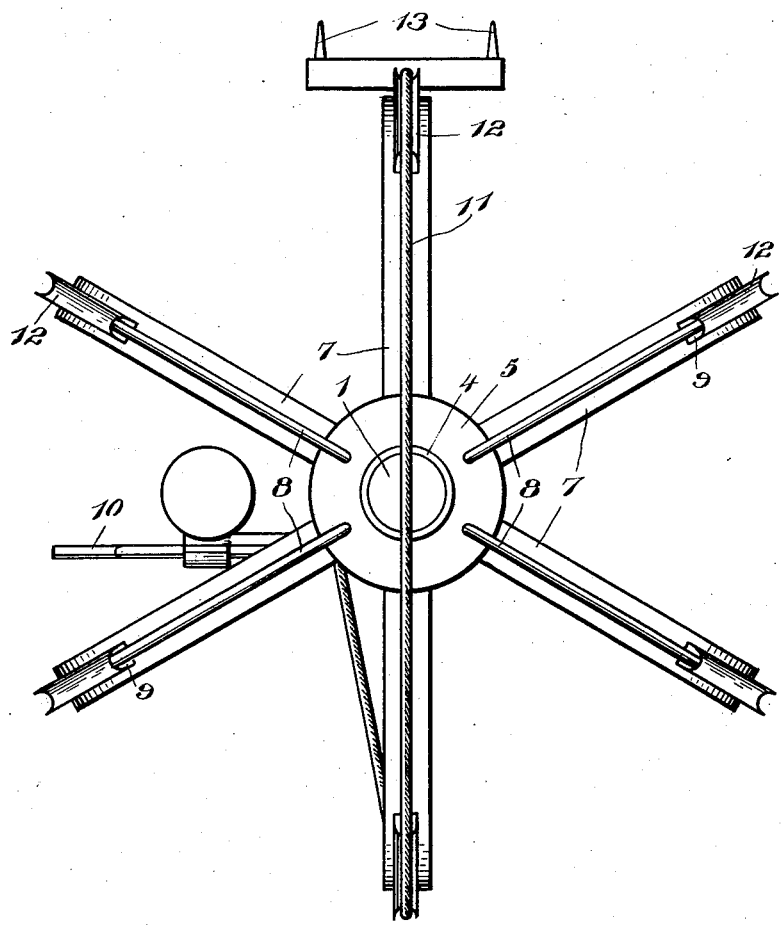

In the drawing, Figure 1 is a side elevation of an animal lifter constructed in accordance with this invention. Fig. 2 is a top plan view.

Referring to the drawings, 1 designates a main post secured to the ground or other support in any suitable manner having a collar 3 adapted to engage a shoulder 2, arranged near the center of said post. The upper end of said post is provided with a collar 4, also. Both of said collars are provided with horizontal flanges 5 and 6.

7 designates the inclined posts which rest on the lower collar and are secured in the proper position by arms 8 which pass through a slot 9 in each of said inclined posts. The arms 8 are connected with the flange 5 of the collar 4. The arms 8 are provided with hooks 9' which serve as shoulders for preventing the spreading of the inclined posts, as well as for holding the hogs, after they have been raised thereto by the hereinafter described means.

The hogs or animals are raised by means of a windlass 10 having a suitable cable 11, which passes over pulleys 12. The cable is provided at its free end with hooks 13 which engage the animal, and transfer the same to the hooks 9, when sufficiently elevated.

It will be seen by reference to Fig. 2, that in practice, the cable 11, is placed over the pulleys 12, and the hooks 13 are then connected with the rear legs of the hog or other animal and then the same is readily lifted by simply winding the windlass, as will be readily understood.

What I claim is,

An animal lifter, comprising outwardly inclined supports, having slotted upper ends, pulleys mounted in said slots, arms connected with a central support, and passing through said slots, said arms having curved outer portions for supporting an animal, and for the purpose of operating as shoulders for preventing the spreading of the said inclined supports, and means for lifting an animal up to said curved portions, substantially as described.

In testimony whereof I have signed my name to this specification in the presence of two subscribing witnesses.

PHILIP M. LEFTRIDGE.

Witnesses:
    ELMER PRICE,
    R. M. KEMPER.